(12) United States Patent
Neal et al.

(10) Patent No.: US 9,374,652 B2
(45) Date of Patent: Jun. 21, 2016

(54) CONFERENCING DEVICE SELF TEST

(71) Applicant: Dolby Laboratories Licensing Corporation, San Francisco, CA (US)

(72) Inventors: Timothy J. Neal, West Ryde (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 102 days.

(21) Appl. No.: 14/387,171

(22) PCT Filed: Mar. 21, 2013

(86) PCT No.: PCT/US2013/033367
§ 371 (c)(1),
(2) Date: Sep. 22, 2014

(87) PCT Pub. No.: WO2013/142728
PCT Pub. Date: Sep. 26, 2013

(65) Prior Publication Data
US 2015/0049583 A1     Feb. 19, 2015

Related U.S. Application Data

(60) Provisional application No. 61/614,586, filed on Mar. 23, 2012.

(51) Int. Cl.
*H04R 29/00* (2006.01)

(52) U.S. Cl.
CPC ............ *H04R 29/004* (2013.01); *H04R 29/006* (2013.01); *H04R 2201/405* (2013.01)

(58) Field of Classification Search
CPC ............... H04R 29/006; H04R 29/004; H04R 2201/405
See application file for complete search history.

(56) References Cited

U.S. PATENT DOCUMENTS 5,506,832 A    4/1996  Arshi
6,011,830 A    1/2000  Sasin
(Continued)

FOREIGN PATENT DOCUMENTS

EP    0337524         10/1989
EP    2829081 A1 *    1/2015    ........... H04R 29/006
(Continued)

OTHER PUBLICATIONS

Salvador, B. et al., "A Time-Selective Technique for Free-Field Reciprocity Calibration of Condenser Microphones," The Journal of the Acoustical Society of America, American Institute of Physics for the Acoustical Society of America, New York, NY, US, vol. 114, No. 3, pp. 1467-1476, Sep. 1, 2003.

(Continued)

*Primary Examiner* — Daniel Pihulic

(57) ABSTRACT

A plurality of acoustic sensors in a non-anechoic environment are calibrated with the aim of removing manufacturing tolerances and degradation over time but preserving position-dependent differences between the sensors, The sensors are excited by an acoustic stimulus which has either time-dependent characteristics or finite duration. The calibration is to be based on diffuse-field excitation only, in which indirect propagation (including single or multiple reflections) dominate over any direct-path excitation. For this purpose, the calibration process considers only a non-initial portion of sensor outputs and/or of an impulse response derived therefrom. Based on these data, a frequency-dependent magnitude response function is estimated and compared with a target response function, from which a calibration function is derived.

9 Claims, 8 Drawing Sheets

(56) References Cited

U.S. PATENT DOCUMENTS

| | | |
|---|---|---|
| 6,185,419 B1 | 2/2001 | Sasin |
| 6,304,634 B1 | 10/2001 | Hollier |
| 6,411,623 B1 | 6/2002 | DeGollado |
| 6,888,925 B2 | 5/2005 | Spitzer |
| 7,099,438 B2 | 8/2006 | Rancu |
| 7,386,109 B2 | 6/2008 | Suzuki |
| 7,602,923 B2 | 10/2009 | Lee |
| 7,738,643 B1 | 6/2010 | Garrison |
| 7,801,280 B2 | 9/2010 | Conway |
| 2003/0053646 A1 | 3/2003 | Nielsen |
| 2007/0050451 A1 | 3/2007 | Caspi |
| 2007/0286347 A1 | 12/2007 | Moore |
| 2008/0266385 A1 | 10/2008 | Smith |
| 2010/0080374 A1 | 4/2010 | Hepworth |
| 2010/0097441 A1 | 4/2010 | Trachtenberg |
| 2010/0135481 A1 | 6/2010 | Frauenthal |
| 2015/0049583 A1 * | 2/2015 | Neal .......... H04R 29/006 367/13 |

FOREIGN PATENT DOCUMENTS

| | | |
|---|---|---|
| JP | 59-226550 | 12/1984 |
| JP | 1-319356 | 12/1989 |
| JP | 2004-013632 | 1/2004 |
| JP | 2011-135272 | 7/2011 |
| WO | 02/01915 | 1/2002 |
| WO | WO 2013142728 A1 * | 9/2013 .......... H04R 29/006 |

OTHER PUBLICATIONS

Stan, G.-B., et al., "Comparison of Different Impulse Response Measurement Techniques," Journal of the Audio Engineering Society, vol. 50, No. 4, pp. 249-262, Apr. 1, 2002.

Farina, A., "Simultaneous Measurement of Impulse Response and Distortion with a Swept-Sine Technique (preprint 5093)," Presented at the 108th AES Convention, Paris, France, pp. 1-23, Feb. 19-22, 2000.

* cited by examiner

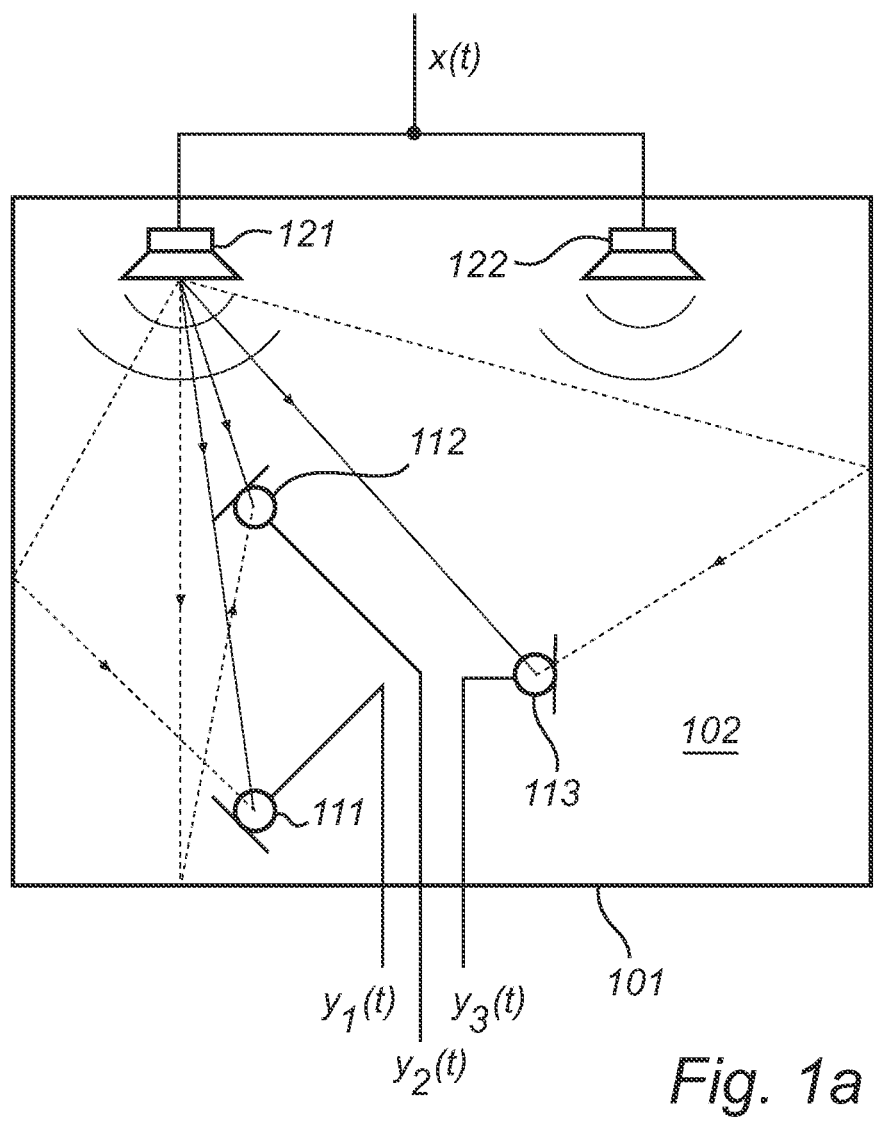
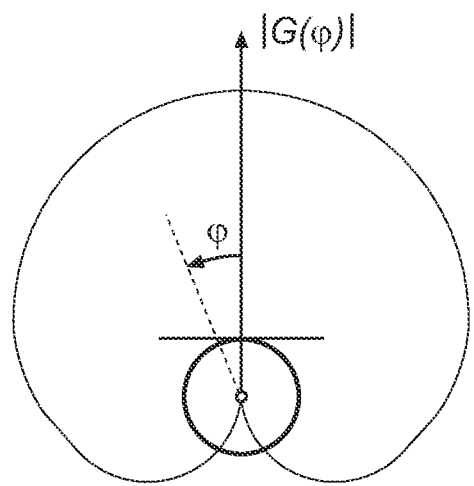
Fig. 1a
Fig. 1b

US 9,374,652 B2

CONFERENCING DEVICE SELF TEST

CROSS-REFERENCE TO RELATED APPLICATIONS

This application claims the benefit of priority to U.S. Provisional Patent Application Ser. No. 61/614,586 filed on 23 Mar. 2012, hereby incorporated by reference in its entirety.

TECHNICAL FIELD OF THE INVENTION

The invention disclosed herein generally relates to multi-sensor acoustic measurements and more precisely to a calibration process for a directive acoustic sensor arrangement. It is presently intended to apply the invention to voice communication systems, such as conferencing endpoints.

BACKGROUND OF THE INVENTION

A conferencing endpoint relies on the known response of electro-acoustic transducers (speakers and microphones) to provide an effective communication experience. However, manufacturing tolerances and degradation over time mean that response of individual transducers can vary significantly. For example, it is typical to see ±5 dB variation across the pass band of a typical electret microphone used in a conference phone. The response of these devices is particularly important when the endpoint is attempting to conduct spatial capture of the audio through the use of multiple microphones. In this case, assumptions are made by the signal processing algorithms about the relationships between the transfer functions of the transducers, e.g., based on rough estimations of the transfer function based on known locations and/or orientations of the microphones together with a sound propagation model. If these assumptions do not hold, the algorithmic performance is compromised.

It is therefore desirable to perform calibration and tuning to ensure optimal performance of the device. In a conferencing endpoint, multiple directional microphones may be calibrated using the device speakers to generate a test stimulus. This approach does not presuppose uniform speaker-to-microphone coupling, which is typically influenced by the spatial arrangement of the transducers or by speaker and output gain stage tolerances.

In traditional methods for such a calibration, the device speaker is driven with a test stimulus and the corresponding input recorded at the microphones. The impulse response for each microphone may then be determined by deconvolving the input signal with the output signal. In other cases, the response may be determined as the difference between a captured and an expected spectral response for a known stimulus. An appropriate equalization filter is then derived based on the measured impulse response or captured spectra and a correction filter used to modify the response towards a target. The impulse response is typically dominated, at least initially, by the direct path between the speaker and microphone.

A problem associated with this approach is the necessity to make assumptions about microphone directionality, speaker-to-microphone coupling, speaker consistency and knowledge of the actual room acoustics or suitable testing room (e.g. semi-anechoic) before deriving the equalization filter. An arrangement depicted in FIG. 1 illustrates a case where a measuring system includes three directional microphones 111, 112, 113, each having cardioid spatial sensitivity as depicted and all three being in a substantially constant spatial relationship during operation. The impulse response of each microphone is likely to be dominated by the direct path (solid line) from each speaker 121, 122. Accordingly, the first and third microphones 111, 113 are likely to receive similar levels from the first speaker 121, while the second microphone 112 will have significantly higher level as it is closer to the speaker 121 and has higher spatial sensitivity in the direction of the speaker 121. These characteristics are an important part of the design of the microphone/speaker arrangement shown in FIG. 1.

If the three microphones were equalized uniformly based on this measurement, the described differences in response would be removed, which would corrupt the performance of this microphone array. In traditional methods, therefore, it would be required to estimate the impact of these factors (microphone/speaker distance, spatial response) and account for them in the equalization process with the aim of preserving the spatial capture of the arrangement.

BRIEF DESCRIPTION OF THE DRAWINGS

Example embodiments of the invention will now be described with reference to the accompanying drawings, on which:

FIG. 1 shows a microphone/speaker arrangement and a spatial sensitivity curve of a microphone in the arrangement.

All the figures are schematic and generally only show parts which are necessary in order to elucidate the invention, whereas other parts may be omitted or merely suggested. Unless otherwise indicated, like reference numerals refer to like parts in different figures.

DESCRIPTION OF EMBODIMENTS OF THE INVENTION

I. Overview

Figure 2:
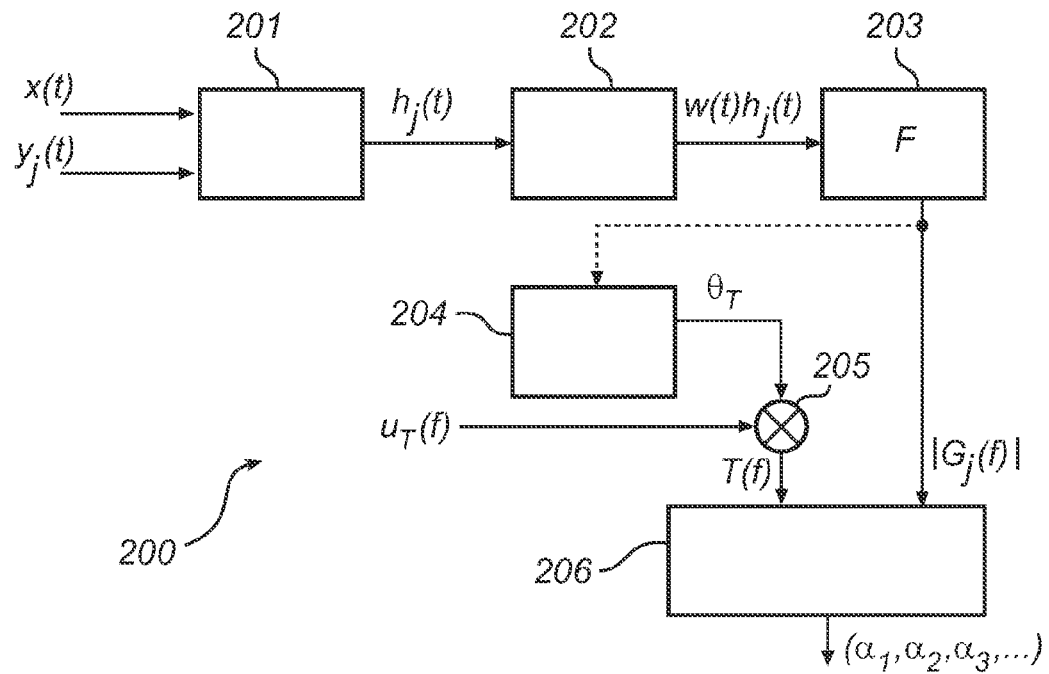
FIG. 2 shows, according to an example embodiment, a controller for providing a calibration function on the basis of audio sensor outputs recorded in connection with excitation by an audio stimulus and a desired target response shape.

It is an object of the present invention to facilitate calibration of an arrangement of multiple directive sensors of the type described above. It is a particular object to enable a useful calibration process which can be executed on and a sensor arrangement without access to information concerning the spatial relationship of the sensors. It is a further particular object to enable a sensor calibration process that preserves the spatial capture of the arrangement.

Example embodiments of the invention provide methods, devices and computer-program products with the features set forth in the independent claims.

In an example embodiment, the invention proposes a method for calibrating a plurality of acoustic sensors, which are arranged in a non-anechoic environment. While not essential to the invention, it is intended that the spatial relationship (as to location and/or orientation) of the acoustic sensors during calibration remains the same during the actual measurements. Being non-anechoic, the environment is preferably delimited by boundary elements (as exemplified by boundary elements 101 in FIG. 1) that are to some extent acoustically reflecting, that is, not highly or completely sound-absorptive by virtue of their materials, shape or surface structure.

In this example embodiment, each acoustic sensor is excited, either singly or together with other acoustic sensors, by an acoustic stimulus travelling to the sensor as acoustic waves through the environment. Based on the output from each acoustic sensor, a magnitude frequency response for this sensor is derived. The magnitude frequency response may be the magnitude (or absolute value) of the transfer function. Alternatively, the calibration process is performed in terms of signal power functions, e.g., squared magnitude of a transfer function; such calibration process may achieve an equivalent result.

Then, by comparison of the magnitude frequency response and a target response function, a frequency-dependent calibration function (or calibration filter or calibration process) is derived. The compensation afforded by the calibration may be complete, in which case the calibration function may correspond to the difference between the magnitude frequency response and the target response. Alternatively, it may be non-complete, wherein the calibration function is a down-scaled version of said difference, possibly obtained by scaling down different frequency bands to different extents, as may be motivated by accuracy requirements or psychoacoustic considerations.

The calibration function, which forms the output of the calibration method, may be a piecewise constant calibration function, which may be represented as a sequence of magnitude equalization factors to be applied in respective frequency bands. It may also be a function of frequency, which may for instance be represented as polynomial coefficients, splines, interpolation points or the like.

In this and other embodiments, the calibration process disregards either an initial portion of the audio sensor output or an initial portion of an impulse response computed on the basis of the audio sensor output. There remains a non-initial portion of the concerned signal. As used herein, 'initial' will refer to the time segment following immediately upon an initial point in time. It is understood that the initial point in time of a discrete impulse response may be the zeroth sample. Further, in an output signal from an acoustic sensor, the initial point in time may be the same instant as an audio source begins producing the acoustic stimulus. By convention, the initial point in time may also be the first instant at which energy in the acoustic stimulus reaches the sensor, that is, an instant delayed by approximately the sound propagation time along the shortest path from the source to the sensor.

Initially after an acoustic stimulus is emitted from an audio source, different acoustic sensors are excited differently, depending on their positions relative to the audio source producing the acoustic stimulus. This is because, as discussed above, the direct propagation path is responsible for the main contribution, so that wave front expansion (inverse square law), propagation loss and spatial selectivity of the sensors will influence the signal power to different extents. Immediately after the initial phase, each sensor will further receive contributions from reflected waves, including early echoes, cf. dashed propagation paths in FIG. 1. Even later, e.g., after the end of an acoustic stimulus having finite duration, only indirectly propagating sound waves will impinge on the audio sensor. The level of the response will typically decay exponentially with time, while the reflections get denser. A sensor excitation in which the direct-path contribution does not dominate will be referred to herein as diffuse-field excitation. An instance of diffuse-field excitation may be restricted to a specific frequency range, for instance, in a case where an audio source produces an acoustic stimulus that is partitioned into successive time segments having distinguishable spectral characteristics, whereby a sensor will receive the diffuse-field excitation originating from a frequency range pertaining to a preceding time segment simultaneously with the direct-path excitation in a current time segment. Those skilled in the art will realize how diffuse-field measurements can be conducted in this or similar situations by separating the received signal into spectral components.

Clearly, the initial phase of a sensor output will typically be dominated by the direct-path excitation, in which the sensor positions will be more influential to the appearance of the sensor signals. In the diffuse-field phase, the different sensors will be excited in a more equal manner. If sensors of a same model are still distinguishable in this regime, this is likely due to insufficient calibration or to the placement of the sensors in relation to the geometry of the non-anechoic environment (e.g., for non-uniform reflection patterns) rather than their proximity to the audio sources or alignment in relation to these.

These characteristics of the sensor outputs will typically carry over to impulse responses calculated on the basis of the sensor outputs. Indeed, the early portions of different impulse responses may differ significantly between sensors having different spatial relationships to an audio source, whereas non-initial portions of impulse responses for different well-calibrated identical audio sensors typically differ to a much lesser extent. Based on this insight, the invention provides methods and devices enabling an acoustic sensor arrangement to be calibrated in the sense that the calibrated sensors will act as devices being identical within approximation but retaining the distinctness they possess by virtue of their different spatial locations. More precisely, because a single target magnitude frequency response is used in respect of all acoustic sensors, the application of the calibration function will make the acoustic sensors to converge to a common magnitude frequency response. It is noted that the directionality pattern and phase response typically have less uncertainty than the magnitude response in commercially available microphones.

Still within the scope of the invention, the environment may be a union of several rooms, which may or may not be acoustically communicating. In the case of very low acoustic coupling between the rooms, the acoustic sensors may be partitioned into subsets each belonging to a common room; in this case, the excitation of the acoustic sensors belonging to different subsets may take place at different points in time or using different stimuli, as long as these provide adequate accuracy for the computation of the frequency-dependent magnitude response function.

In an example embodiment, the calibration process uses an acoustic stimulus x(t) which is associated with a known inverse $x^{-1}(t)$ under convolution. That is, within approximation, $x^{-1}(t)$ has the property $(x*x^{-1})(t) \approx \delta(t)$, where $\delta$ is Dirac's delta distribution. The same stimulus may be produced synchronously from one or more audio sources. As is well known in the art, the impulse response may be successfully estimated also in the case where the convolution inverse is known only for the individual contributions and not for the total stimulus resulting by addition of the different (possibly delayed) sound waves reaching an audio sensor from all audio sources. By using a stimulus of this type, the accuracy may be improved by performing the excitation and sensing over an extended period of time.

According to this example embodiment, the output from an acoustic sensor is deconvolved to yield the time-dependent impulse response of the sensor. After this, a frequency-dependent magnitude response function is derived. In order to give priority to the diffuse-field data, the frequency-dependent magnitude response function (or magnitude of the transfer function) is computed by transforming only a non-initial portion of the time-dependent impulse response. Any harmonic transform suitable for or adapted for digital signal processing, such as a discrete Fourier transform or discrete Laplace transform, may be used for this purpose. The transformation need not return the phase of the transfer function, which may otherwise incur an additional computational load, for it is only the magnitude response with respect to the frequency that will be compared with the target response function and will influence the calibration function. The fact that this embodiment uses deconvolution for computing the impulse response provides good immunity to measurement noise. The accuracy may be further improved by allowing the excitation to proceed for some time and accumulate sensor output signals during this time.

In an example embodiment, which may be regarded as a further development of the preceding one, a windowed version of the time-dependent impulse response is supplied to the transformation process. The windowed version may be obtained by multiplying the impulse response by a window function supported in the non-initial portion. In a use case, the support of the window may be located in a time segment in which diffuse-field excitation is expected to occur. It is a matter of design how the window is to be composed of rise time, constant-valued time and decay time. Generally speaking, and without regard to the conditions in a specific use case, a longer rise and/or decay will allow for smoother windowing that distorts the spectrum to a lesser extent but may also imply that the non-initial portion is excised less distinctly.

In an example embodiment, which is particularly useful where computational resources are limited, direct time gating of the audio sensor response is used to obtain a measure of the diffuse-field response. In this approach, the acoustic stimulus comprises a burst of noise, the spectral composition of which is at least approximately known. For instance, the burst may consist of white noise (flat power density) or pink noise (1/f power density) or some other suitable spread of energy to drive the audio sources and obtain an audio sensor response above a noise floor in the non-anechoic environment. The burst is applied to the audio sources and the sensor response of interest is captured in a non-initial period after the initial excitation. Hence, the initial portion of the audio sensor outputs is disregarded. Preferably, the burst has finite duration and the output from each acoustic sensor is sensed only during a period beginning a finite interval after the burst. The time-selective capturing may be achieved by gating the sensors, that is, by activating them only for a limited time period. With appropriate consideration of the background noise level, which can easily be estimated by techniques that are known per se to others skilled in the art, the spectrum of the signal captured by the sensors can be used as a reasonable approximation of the diffuse-field response of the directional sensors.

The present example embodiment typically requires less computational resources. There is also no requirement for an acoustic stimulus with time-dependent properties, but the noise burst may have equal spectral composition throughout its duration. However, this example embodiment is relatively more noise sensitive. Further, since the noise burst will reach the audio sensors with different amounts of delay while the gating may be synchronous for all sensors, the gating may not always excise the diffuse-field response as accurately as can be achieved by windowing the impulse response. For instance, it may be deemed necessary to add margins before and after the expected diffuse-field portion of the sensor signals, which to some extent reduces the data set available for deriving the calibration function.

In example embodiments, which may be further combined with features from any of the example embodiments described previously, the temporal and approximate directional detail of the impulse response (from uncalibrated sensor response) is analyzed. This may help ensure that the spatial characteristic of the diffuse part of the response over which the calibration is performed is suitably diffuse. Techniques for directional analysis and temporal diffusivity are generally known to others skilled in the art, and may include estimating the degree of statistic time correlation (e.g., using cross correlation or cross covariance) between different sensor outputs. This way, one may determine the presence of a dense set of signal arrivals or the absence of any strong specular or discrete reflections.

In example embodiments, the sensor excitation may be produced by a single audio source. Alternatively, it may be produced by a plurality of audio sources arranged in a single non-anechoic environment. This may enable more uniform and/or more isotropic diffuse-field excitation.

In example embodiments, a calibration process includes a step of sensing a background output from each acoustic sensor. The background output may be regarded as a noise floor or background noise level in the non-anechoic environment. To safeguard the accuracy of the calibration, it is further assessed whether the signal power $P_j$ of the output sensed during excitation of the $j^{th}$ sensor is greater than the signal power $N_j$ of the corresponding background output. The criterion to be assessed may be may relate to simple inequality in terms of signal powers, e.g., $P_j \geq N_j$ or $P_j > N_j$. Alternatively, the criterion may include a multiplicative or additive margin, e.g., $P_j \geq (1+\epsilon)N_j$, $P_j \geq N_j + \epsilon'$ for positive $\epsilon$, $\epsilon'$. The criterion may also be frequency-dependent. For instance, the background output may be partitioned into spectral components, $N_j = N_j(f)$. The frequency-dependent noise curve may then be compared in a point-wise or band-wise fashion with the frequency-dependent magnitude response, e.g., $G_j(f) \geq (1+\epsilon)N_j(f) + \epsilon'$, where $G_j(f)$ denotes the magnitude response of the $j^{th}$ sensor, for f being each of a plurality predefined control frequencies or frequency bands. If the criterion is not fulfilled, corrective action may be taken, e.g., repeating the sensing using increased excitation power.

In example embodiments, the data quality may be further safeguarded by requiring that no sensor outputs differ too significantly from each other, e.g., $|P_i - P_j| \leq \epsilon$ for all $i \neq j$ and positive $\epsilon$. This may otherwise suggest that a systematic measuring error is present, which decreases the likelihood of completing the calibration successfully. As discussed previously, the requirement on limited signal power difference may relate to the total signal power, the average signal power or the signal power difference (or magnitude difference) in each frequency band.

In example embodiments, a reference level calibration is conducted with the purpose of determining an absolute target magnitude response to which all responses should attempt to converge. A number of methods could be used to determine this reference level. A first example is to make use of a known ideal reference level. Based on sensitivity specifications of the acoustic sensors, an absolute expected level could be determined during design. This level could be stored in the devices and used as a means for determining the absolute threshold for the equalization curves. A second method would be to use the different sensor response responses and either average their broadband magnitude response or select the median broadband magnitude response. This level then becomes the set-point to which the device is leveled. Preferably, the reference level is combined with a predefined target response shape, which is normalized by the average or median broadband magnitude response.

In an example embodiment, a directive acoustic measuring method comprises initially calibrating a plurality of acoustic sensors, which are spatially arranged in a manner intended to provide spatial diversity and/or spatial capture, namely, by having non-equal orientations and/or non-equal locations. The acoustic sensors are however of a similar type or model, so that they may ideally act as approximate copies of a basic sensor, the only substantial difference between these copies being their spatial placement. Put differently, all sensors ideally provide identical outputs in response to an acoustic stimulus if the audio source producing the stimulus is placed at a predetermined distance and at a predetermined angle from the respective sensors. The calibration process results in a calibration function which when applied to the sensors causes them to approach the ideal condition of acting as identical sensors located at non-identical positions. The measuring method of this example embodiment further comprises performing at least one spatially directive measurement while applying the calibration function resulting from the calibration process.

In an example embodiment within a further aspect of the present invention, there is provided a controller suitable for being communicatively connected to a plurality of acoustic sensors arranged in a non-anechoic environment and at least one audio source in the non-anechoic environment. Unidirectional connections are sufficient as long as they enable, on the one hand, data to be collected from the acoustic sensors and, on the other, a desired acoustic stimulus to be produced by the audio source. The controller comprises a measuring section operable to excite each acoustic sensor by causing the audio source(s) to produce an acoustic stimulus and to capture, during at least a portion of the excitation period, the outputs from each audio sensor. The controller further comprises a windowing section operable to extract (or 'window out') a non-initial portion of a signal, which may be a sensor output. The windowing section may alternatively be configured to extract a non-initial portion of an intermediate signal computed on the basis of one or more sensor outputs, such as an impulse response. The controller also comprises an impulse response estimator for estimating a frequency-dependent magnitude response function of each acoustic sensor; as input, the estimator may use a non-initial portion of a sensor output (e.g., obtained by gating of the audio sensor) or a larger portion of the sensor output. Further still, the controller comprises a calibrator, which is responsible for the derivation of the frequency-dependent calibration function on the basis of a comparison between the magnitude response function and a target response function.

The dependent claims define example embodiments of the invention, which are described in greater detail below. It is noted that the invention relates to all combinations of features, even if the features are recited in different claims.

II. Example Embodiments

FIG. 2 is a generalized block diagram of a controller 200 according to an example embodiment, the controller 200 being adapted to interact with a plurality of acoustic sensors and at least one audio source. The sensors and source(s) may be of similar types and may be similarly arranged as the sensors 111, 112, 113 and sources 121, 122 located in the environment 102 shown in FIG. 1. A deconvolution section 201 receives at least a time-dependent output $y_j(t)$ of a sensor and deconvolves the output to provide a time-dependent impulse response ha for the sensor in respect of the audio source(s) producing the stimulus. The deconvolution may be enabled at least by one of the following options:

a) The deconvolution section 201 receives, as shown in FIG. 2, a copy of the stimulus x(t) supplied to the audio sourc(e) and derives a convolution inverse $x^{-1}(t)$. Preferably, the copy of the stimulus is received in synchronicity with the signal actually supplied to the audio source. Formally, a convolution inverse may be given by the equation $$x^{-1}(t) = \left(F^{-1}\left(\frac{1}{(Fx)(\omega)}\right)\right)(t),$$

where F is the Fourier operator or some other suitable harmonic transform operator. While symbolic manipulations may suffice to determine the convolution inverse in very simple cases, the convolution is preferably computed numerically. It is understood that the formal inverse equation will be translated into a sequence of computer instructions selected to ensure convergence, desirable accuracy and so forth. It is possible to use a per se known deconvolution algorithm, such as Wiener deconvolution.

b) The deconvolution section 201 receives (not shown) the convolution inverse from a different entity, e.g., from an excitation section responsible for operating the audio source to produce the audio stimulus.

c) The acoustic stimulus is predefined and the deconvolution section 201 comprises a memory (not shown) for storing either the stimulus itself or its convolution inverse.

The deconvolution section 201 supplies the impulse response $h_j(t)$ of at least one acoustic sensor to a windowing section 202, which windows out a non-initial portion corresponding to diffuse-field excitation, $w(t) \times h_j(t)$. The windowing may be achieved by multiplying the impulse response $h_j(t)$ by a windowing function w(t). The windowing is illustrated schematically in FIG. 5. A typical window to use may be the Tukey window (or tapered cosine window), the support of which comprises a cosine-shaped rise portion, a constant portion and a cosine-shaped fall-off portion. What a suitable time position and suitable durations of the various portions of the window are in a practical case, may be decided based on the propagation time from the audio source(s) to the sensors and on the reflection properties of the environment, including the reverberation time and the reflection coefficients of the boundaries of the environment. The start of the window would typically be between 10 and 100 ms into the impulse response. The length of the window (support) would typically be 200 to 2000 ms. For instance, the start of the window may be located at t=50 ms and the end of the window may be located at t=400 ms, wherein the beginning of the excitation is taken to be t=0. The rise and fall-off times may typically be about 20 ms; more generally, they may be selected from the interval from 0 to 100 ms. The rise and fall-off times need not be equal or even comparable in size.

Once the windowing section 202 has extracted the diffuse portion of the impulse response, this signal forms the basis for computing, via a harmonic transformation carried out by a magnitude response estimator 203, a frequency-dependent magnitude response $|G_j(f)|$. The magnitude response estimator 203 may be configured to smoothen the magnitude frequency response.

A normalizer 204 is responsible for determining a suitable scale of the target magnitude response, to which the calibration will cause the responses of the audio sensors to converge. To this end, the normalizer computes broadband magnitude responses for each sensor. For instance, the broadband magnitude response for the $j^{th}$ sensor may be computed as $$P_j = \int |G_j(f)| df.$$

Figure 8:
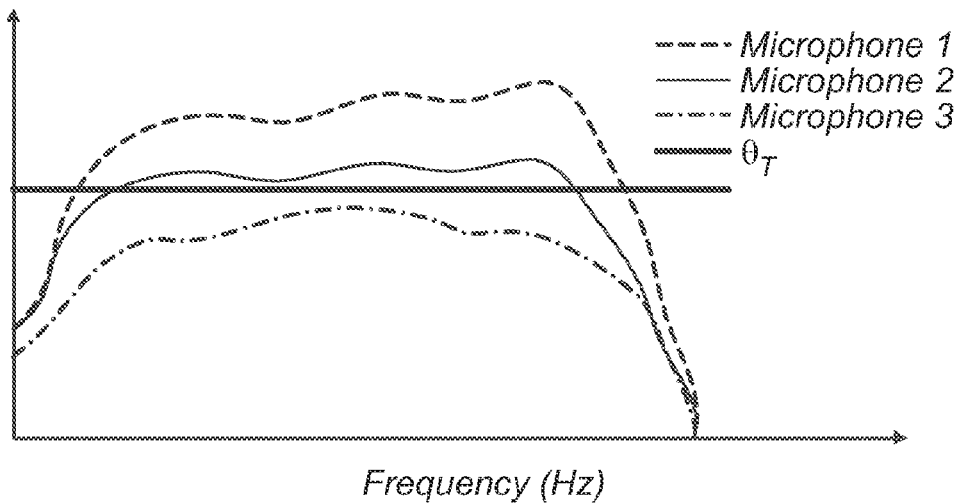
FIG. 8 is a graphic illustration of three magnitude responses and a reference broadband magnitude level to be used in computing a target response function.

(In this and subsequent calculations where different sensor responses or different frequency bands are compared, it is preferable to represent the response functions in logarithmic amplitude scale or a weighted logarithmic scale, e.g., in terms of quantities having unit dB or $dB_A$.) A reference broadband magnitude level may be obtained as an average $\theta_T = (P_1 + P_2 + \ldots + P_n)/n$, a weighted average or some other suitable collective measure. For an example, see FIG. 8. A target magnitude response processor 205, represented in a simplified fashion in FIG. 2 as a multiplier, rescales a predetermined target function shape $u_T$ by the reference broadband magnitude level. If the target function shape has unit total mass, the rescaling amounts to multiplication by the reference broadband magnitude level. In general, and in particular if the target function shape has unknown mass, the target magnitude response may be obtained as per $$T(f) = \frac{\theta_T}{\int u_T(f) df} u_T(f)$$

Figure 9:
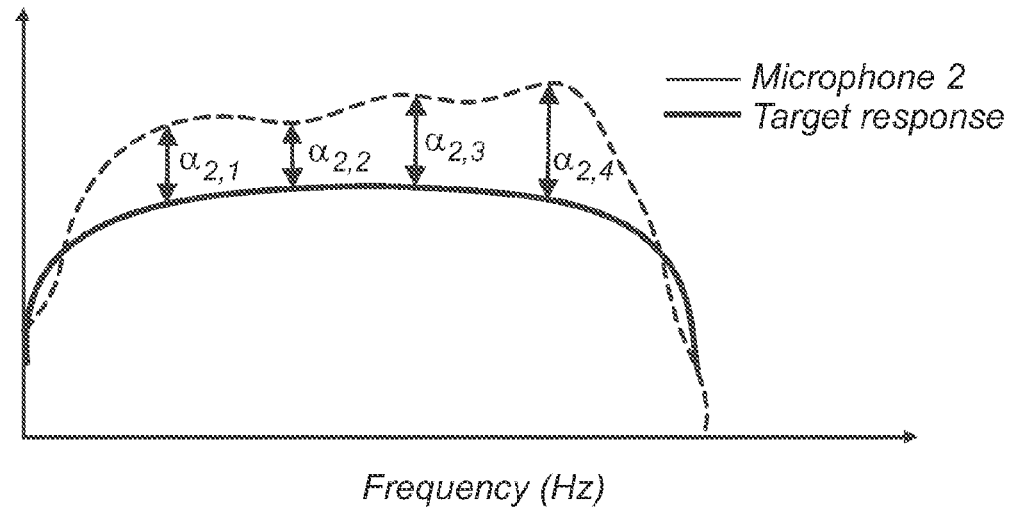
FIG. 9 is a graphic illustration of a magnitude response and a target response function.

Downstream of the magnitude response estimator 203, a calibrator 206 is arranged. It receives the frequency-dependent magnitude response $|G_j(f)|$ and the target magnitude response $T(f)$. The calibrator 206 may carry out a comparison of these quantities in a manner illustrated by FIG. 9. In the embodiment shown in FIG. 2, the target magnitude response is computed on the basis of a predetermined target function shape and a scaling factor $\theta_T$ derived from the magnitude responses of the acoustic sensors; as seen in the above Overview section, however, the target magnitude response may be provided in alternative ways. The calibrator 206 derives, for the $j^{th}$ sensor, equalization constants $(\alpha_{j,1}, \alpha_{j,2}, \ldots, \alpha_{j,m})$ to be applied in respective first, second etc. frequency bands, that is.

$$\tilde{G}_j(f) = \alpha_{j,k} |G_j(f)|, f_{k-1} \leq f \leq f_k.$$

The values of the equalization constants may be chosen such that one or more of the following criteria are fulfilled:

a) Pointwise bounded error: $|T(f) - \tilde{G}_j(f)| \leq \varepsilon$, $f_{k-1} \leq f \leq f_k$;

b) Error bounded in mean:

$$\int_{f_{k-1}}^{f_k} |T(f) - \tilde{G}_j(f)| df \leq \varepsilon';$$

c) Bounded maximum error:

$$\max_{f_{k-1} \leq f \leq f_k} |T(f) - \tilde{G}_j(f)| \leq \varepsilon'',$$

wherein the constants on the right-hand sides of the inequalities are positive.

Figure 3:
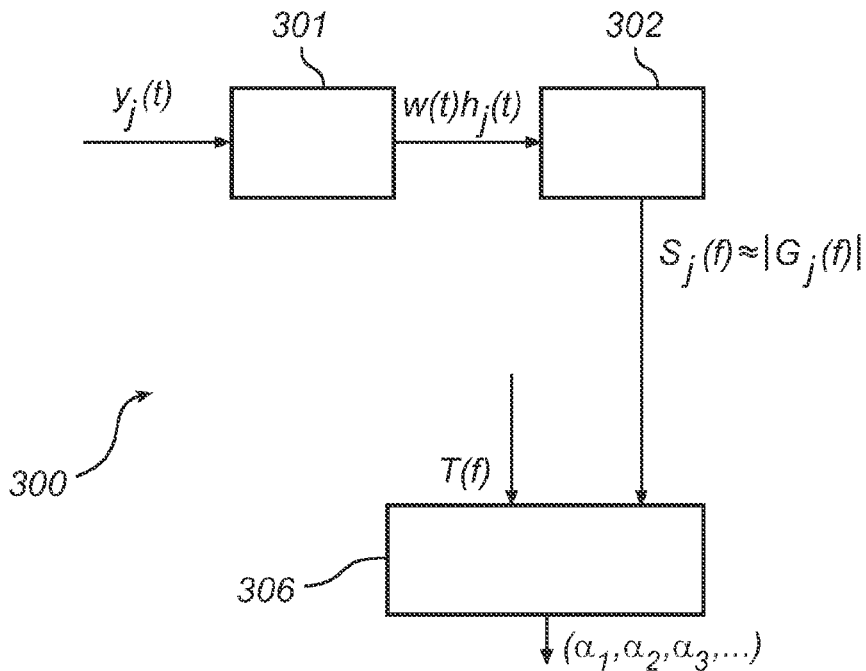
FIG. 3 shows, according to a simplified example embodiment, a controller for providing a calibration function on the basis of audio sensor outputs and a desired target response.
Figure 10:
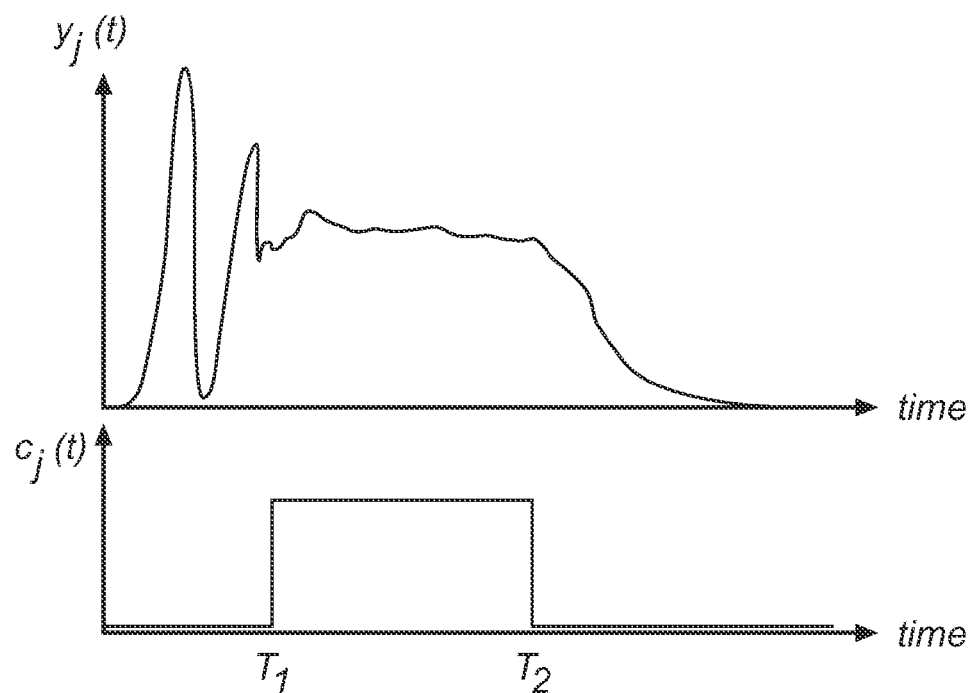
FIG. 10 illustrates operation of the controller shown in FIG. 3, including the step of sensing the output of acoustic sensor only during a predetermined time segment corresponding to the diffuse-field excitation.
Figure 10:
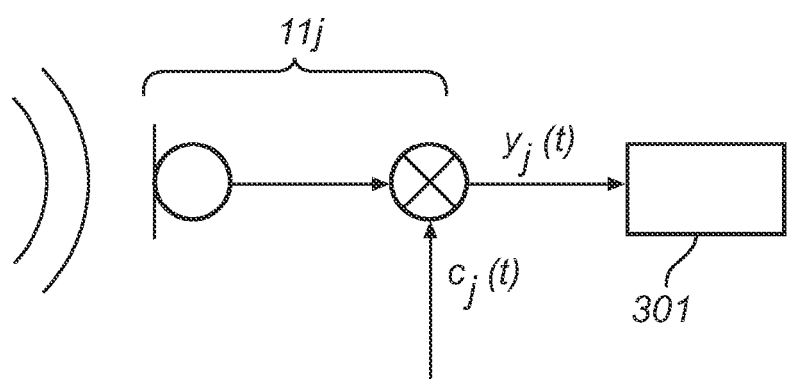

FIG. 3 shows a second example embodiment of the invention, namely a controller 300 applying signal windowing to the sensor outputs $y_j$ rather than to the impulse responses $h_j$, as in the preceding embodiment. A windowing section 301 is responsible for the windowing, which may proceed either by multiplication by a windowing function, as described previously and suggested by FIG. 3, or by gating the audio sensors. To this end, as illustrated schematically in FIG. 10, a gating signal $c_j$ is provided to the $j^{th}$ sensor 11*j*, causing the sensor to be active during a non-initial period $[T_1, T_2]$ after the audio stimulus. Outputs resulting from diffuse-field excitation are expected to be captured in the non-initial period. The windowing section 301 may be responsible both for generating the gating signal and capturing the gated output signal from the audio sensor. A magnitude response estimator 302 arranged downstream thereof computes a periodogram $S_j(f)$ for the $j^{th}$ sensor. As used herein, a periodogram is a frequency-dependent approximation of the magnitude response $|G_j(f)|$ of the sensor. Because the initial portion of the sensor output is not taken into account—the windowing excludes the initial portion—the periodogram is not influenced by components present in the early response, e.g., direct-path excitation which is sensitive to sensor placement. A calibrator 306 computes a calibration function, preferably represented as band-wise equalization factors $\alpha_1 = (\alpha_{1,1}, \alpha_{2,1}, \ldots, \alpha_{n,1})$, $\alpha_2 = (\alpha_{1,2}, \alpha_{2,2}, \ldots, \alpha_{n,2})$, wherein factor $\alpha_{j,k}$ is to be applied in the $k^{th}$ band and for the $j^{th}$ sensor.

Figure 4:
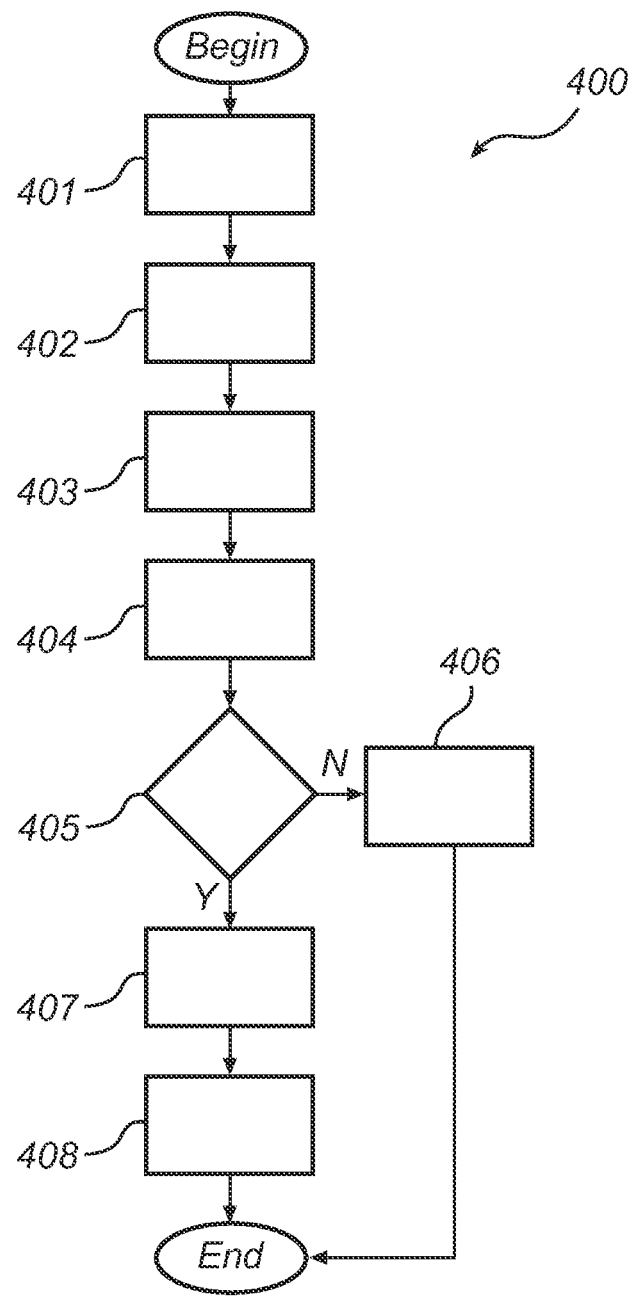
FIG. 4 is a flowchart of a calibration process according to an example embodiment.

FIG. 4 is a flow chart showing a calibration process 400 for a multi-sensor arrangement, according to an example embodiment of the present invention. A first step 401 relates to measurement initiation. A number of different initiation processes are envisaged. Active initiation is where the self-test of the device is initiated by a user through some form of user interface as part of a periodic maintenance schedule. Automatic initiation is where the device determines it is necessary to run self-test due to a maintenance schedule, knowledge of an upcoming conference call, absence of the user as evidenced by instant messaging presence indicators, time of day (e.g., middle of the night), audio scene analysis. Additional detectors could also be provided on the device to initiate self-test such as an accelerometer or compass, change in IP address, all of which help to determine whether the device has been moved. In variations to this, the calibration is run as part of a manufacturing or installation process. In the case of the calibration being part of the manufacture process, the calibration could be further improved by the use of a dedicated room or reverberant chamber having suitably reflective surfaces and diffuse reverberant field properties. In particular, the test chamber may have different dimensions than the room where it is intended to install the conference endpoint.

In a second step 402, the impulse response measurement is carried out. This involves generating a test signal out of device speakers (audio source) and recording the response of the microphones (acoustic sensors) during the test signal. There are a number of test signals that could be used such as Maximum Length Sequences (MLS) and various swept sine signals. For a review of some exemplary techniques, see G.-B. Stan, J.-J. Embrechts, D. Archambreau, "Comparison of different impulse response measurement techniques", *Journal of the Audio Engineering Society*, vol. 50 (2002), no. 4, pp. 249-262. Preferably, logarithmically spaced sine sweeps are used, as described by A. Farina in "Simultaneous measurement of impulse response and distortion with a swept-sine technique (preprint 5093)", presented at the 108$^{th}$ AES Convention, Paris, France, 19-22 Feb. 2000. This type of stimuli benefits from good signal-to-noise ratio (SNR) and the ability to separate out the distortion components from the response; it may expect that conference end-point speakers would have significant distortion levels. As a further potential benefit, the acoustic stimulus can be played below the human audibility limit, so as to make the self test discreet and non-intrusive to users. Alternatively, the stimulus may be played at an intensity level close to the noise floor of the room.

The following Matlab™ code excerpt describes how to create an exemplary log-spaced swept sine signal and its convolution inverse:

```
fs = 48000;
duration = 2.3; % seconds
l = round(duration * fs);
fade = 7;
fl = 100;
t0 = floor((l-fade)/(1+log(fs/2/fl)));
sweep = sin(cumsum([linspace(0,fl,t0) ...
    logspace(log10(fl),log10(fs/2),l - t0 - fade) ...
    fs/2*ones(1,fade)]'/fs*2*pi));
sweep = sweep.*[ones(1,l - fade) ...
    cos((0:fade - 1)/fade/2*pi). ̂2]';
inverse = ifft( ...
    1./fft([zeros(50000,1); sweep; zeros(50000,1)]));
inverse = inverse(50000+(-1999:duration * obj.fs+8000));
```

It may sometimes be preferable to create an approximate omnidirectional source, in which case all output speakers may be driven with an identical stimulus. In other cases, the process may be repeated with each speaker, or unique combination of speakers being driven with some fixed gain vector. Then the results from each of these measurements may be additionally compared to provide a further point of reference to understand any room response impact. Generally, the proposed invention provides a large degree of robustness to any room response variations, and therefore this step of exciting different speaker combinations is not required and need not form part of embodiments of the invention. The audio stimulus is played out of the selected set of device speakers while the output from the microphones is being recorded (e.g., stored permanently, stored transitorily or forwarded to the next stage of the processing chain). Preferably, all speakers on the device are utilized simultaneously, with the purpose generating the most isotropic sound field as possible within the constraints of the device. Once the sweep is complete the recorded microphone data is convolved with the inverse sweep signal above to obtain the impulse response.

Figure 5A:
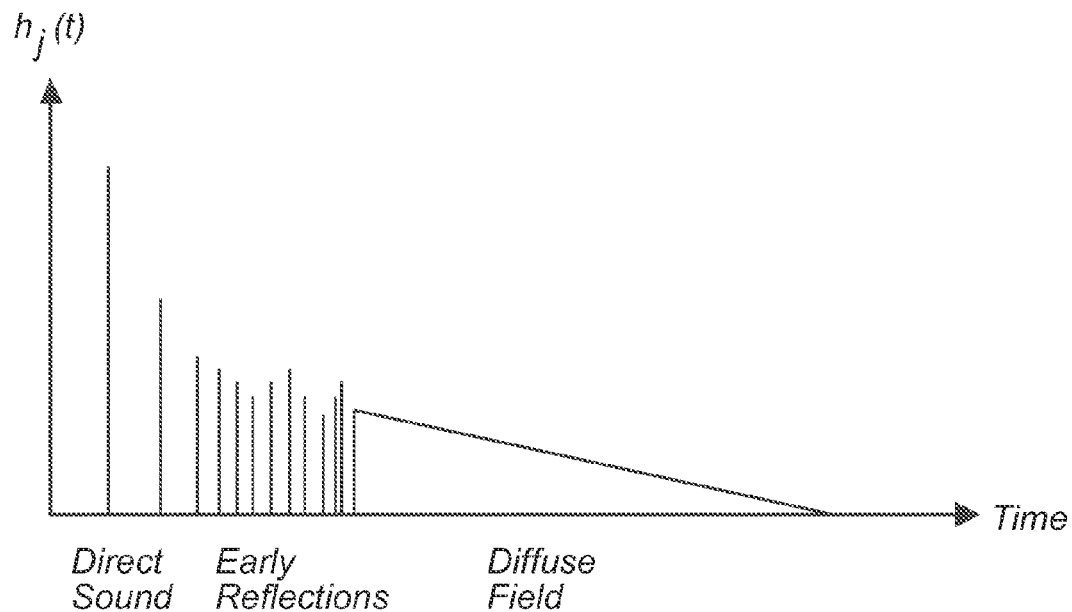
FIG. 5 contains graphic illustrations of impulse responses with and without windowing.
Figure 5B:
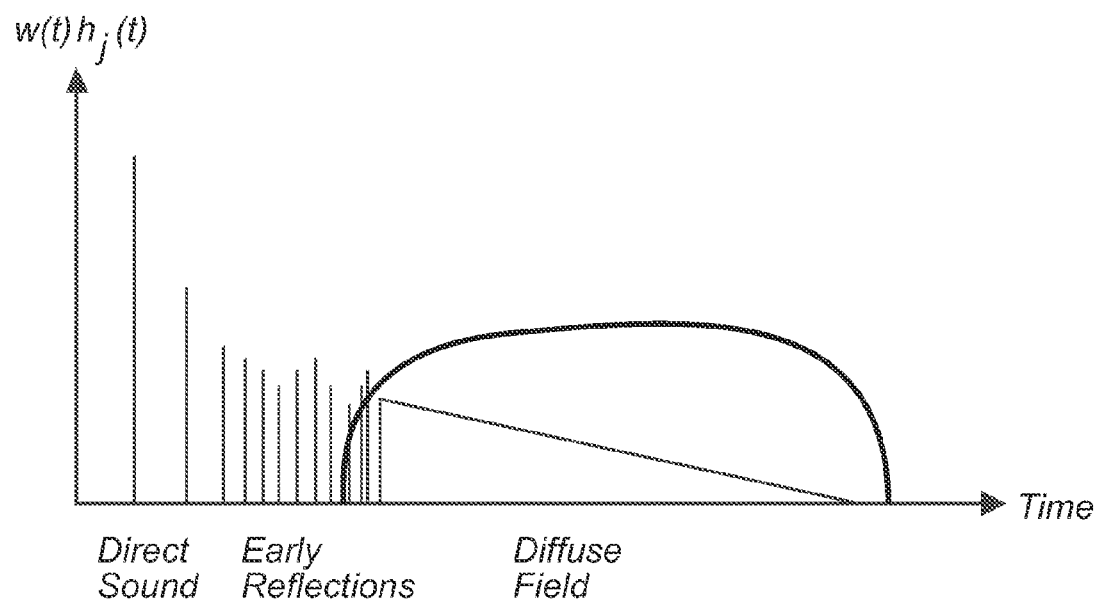
Figure 6:
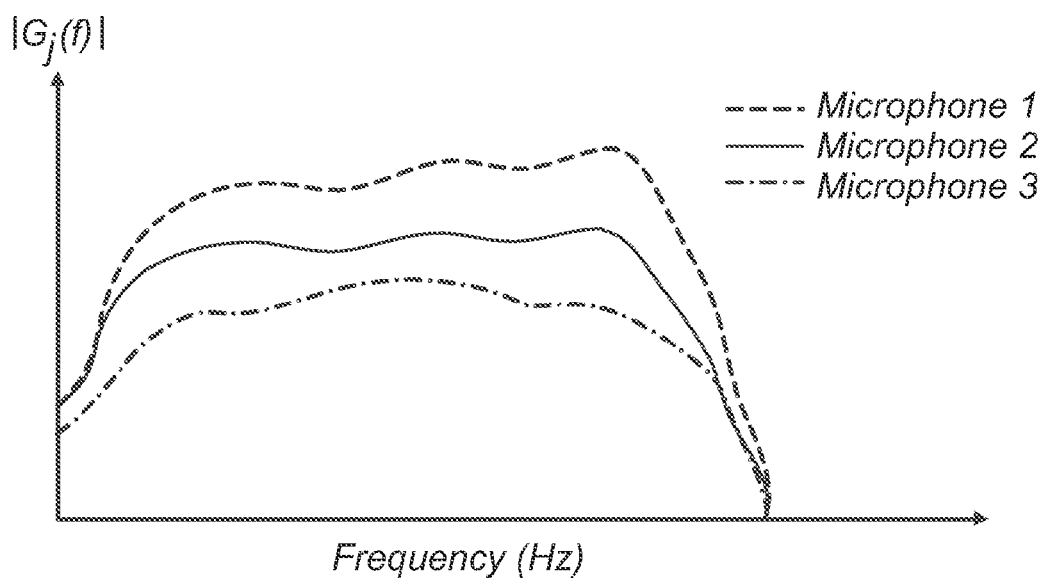
FIG. 6 is a graphic illustration of a magnitude response for three acoustic sensors having different placements in an environment.

In a third step 403, the diffuse-field magnitude response is extracted, as described previously. FIG. 5A depicts a schematic representation of a typical impulse response. The strongest peak is due to the direct sound (i.e., propagated along a direct path) from the speaker to the microphone. Following this direct sound, the first early reflections generate further sparse peaks. Over time the level of the response exponentially decays but the density of reflections increases. The tail of the response contains the most density and by this time the reflections are coming from most directions. This section is used in order to calibrate the microphone since it approximates an isotropic field. Once the diffuse portion of the impulse response has been extracted, the magnitude frequency response is computed by taking the magnitude of the Fourier transform of the data. Depending on the frequency resolution required, this response may be smoothed, for example by grouping into ⅓-octave bands (e.g., ANSI S1.11-2004, class 1) or using the method of averaged periodograms. The result of these calculations will be a set of magnitude responses as depicted in FIG. 6.

In a fourth step 404, the noise floor of the measuring environment is measured. This is achieved by recording the microphone inputs while no output is generated by the speakers. The length recorded would typically be 100 to 500 ms in length. The magnitude response of this noise floor data can then be calculated and smoothed in the same way as the impulse response data was calculated. It is noted that the noise floor estimate must take into account the measurement bandwidth of each frequency point in the impulse response to allow the values to be compared.

Figure 7A:
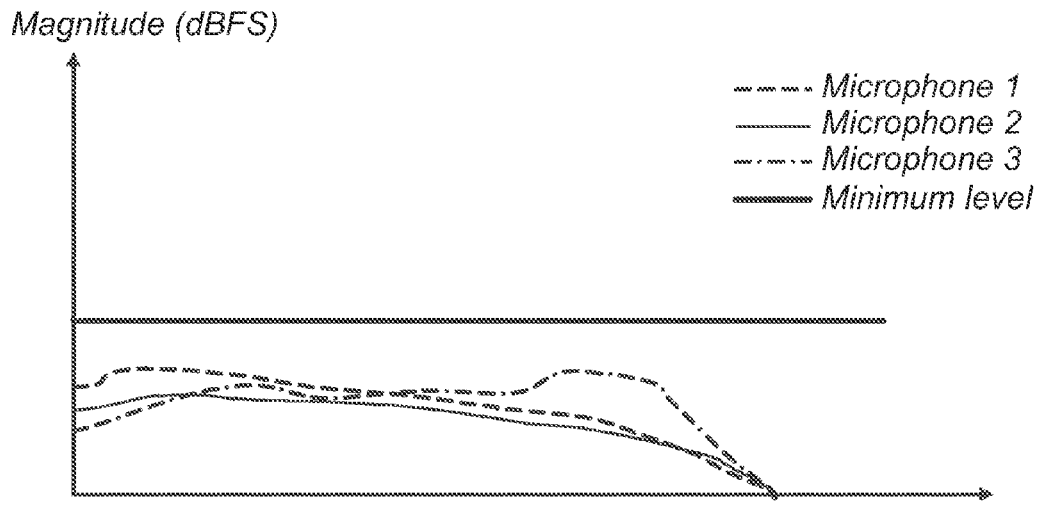
FIG. 7A is a graphic illustration of three magnitude responses and a minimum power threshold level.
Figure 7B:
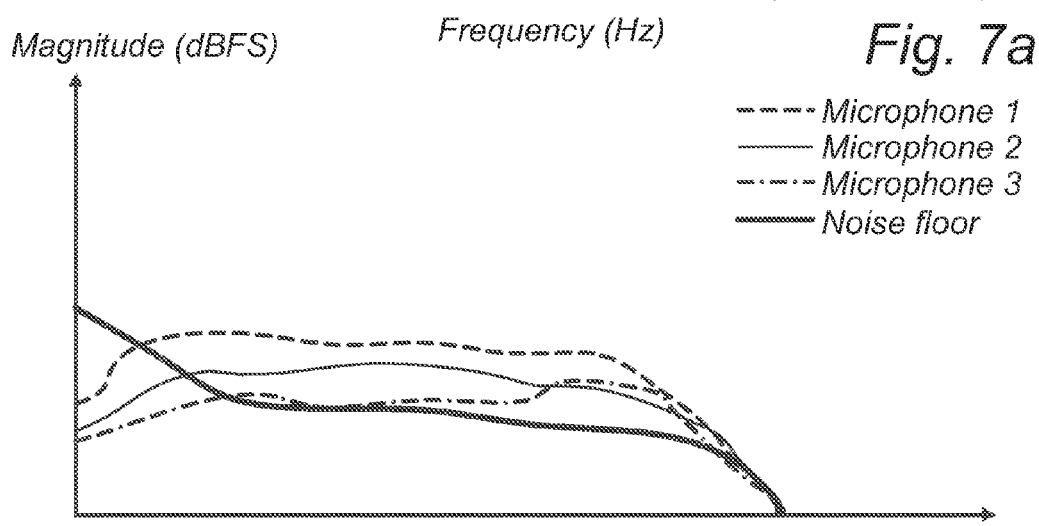
FIG. 7B is a graphic illustration of three magnitude responses and a frequency plot of the noise floor power.
Figure 7C:
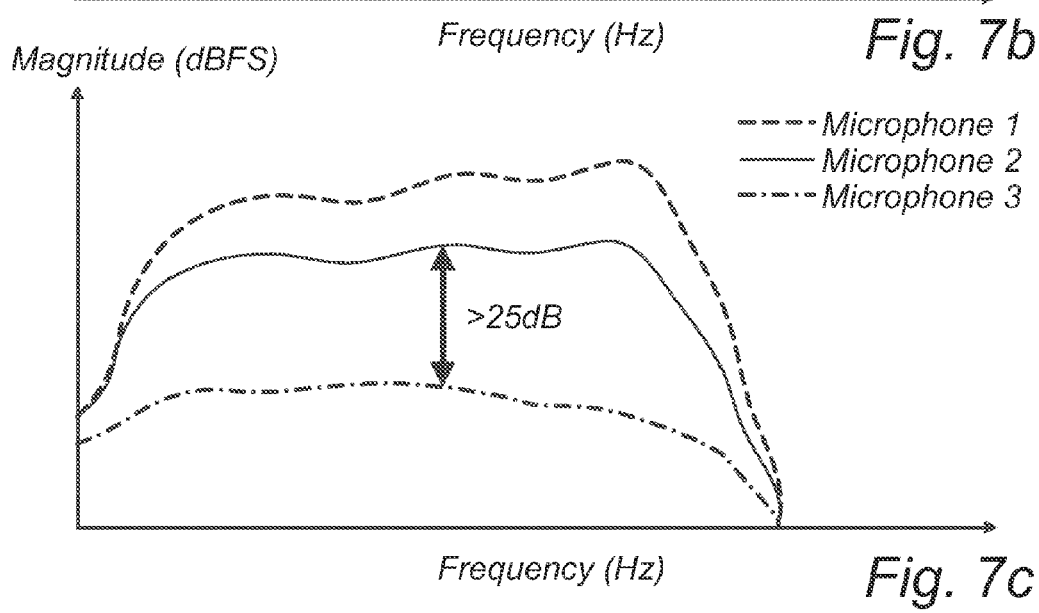
FIG. 7C is a graphic illustration of three magnitude responses, wherein a bounded-difference criterion is being assessed.

A fifth step 405 in the calibration process comprises a basic functional check. It is noted that in some acoustic environments (e.g., semi-anechoic chambers), there may be insufficient reflections to generate a diffuse field to be used for calibration purposes. Firstly, the overall level of the diffuse magnitude responses may be checked to ensure that the measurement was successful. If all microphone responses (including the noise floor) fall below a specified threshold (e.g., −70 dB$_{FS}$), then it may be expected that either the speaker or the microphones are not functional and calibration should not proceed. Secondly, it may be verified that the measured microphone responses are not too close to the noise floor (e.g., <10 dB above), in which the response measurements may be considered unreliable. Once again calibration may be interrupted or the response measurements should be repeated and averaged to remove the effect of the noise on the measurements. Finally, if the difference between any two microphones is too large (e.g., >25 dB) on average across the pass band, this indicates a problem with the measurement system and the calibration may be abandoned. The three requirements are visualized in FIG. 7. Whether or not to continue the calibration process may be made conditional on the fulfilment of one or more of these requirement. Preferably, the process enters a failure condition 406 as soon as one of the three requirements fails.

The two subsequent steps 407, 408 of the calibration process relates to broadband reference level calculation and computation of the individual calibration functions. These steps have been described in great detail above, according to two different approaches.

III. Equivalents, Extensions, Alternatives and Miscellaneous

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media), and communication media (or transitory media). As is well known to a person skilled in the art, the term computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of operating a plurality of acoustic sensors arranged in a non-anechoic environment, the method comprising the steps of:
   exciting each acoustic sensor by producing, in the non-anechoic environment, an acoustic stimulus comprising a noise burst of finite duration, and concurrently sensing an output from each acoustic sensor only during a time period beginning a finite interval after the end of the acoustic stimulus;
   computing a frequency-dependent magnitude response function of each acoustic sensor based on at least a non-initial portion of the output from each acoustic sensor, said computation being based on the sensed output from the acoustic sensor and a spectral composition of the noise burst; and
   deriving a frequency-dependent calibration function based on a comparison of the magnitude response functions thus obtained and a target response function which is common to all acoustic sensors.

2. The method of claim 1, further comprising evaluating an acoustic diffuseness metric based on the output from each acoustic sensor and, optionally, further based on information concerning the spatial relationship of the acoustic sensors.

3. The method of claim 1, wherein the acoustic stimulus is produced using a plurality of sources arranged in one non-anechoic environment.

4. The method of claim 1, further comprising:
   sensing a background output from each acoustic sensor in the absence of an acoustic stimulus; and
   verifying that signal powers of the outputs sensed during excitation are sufficiently greater than the signal power of each background output.

5. The method of claim 1, further comprising:
   computing signal power differences between outputs from the respective acoustic sensors; and
   verifying that no signal power difference exceeds a predetermined threshold.

6. The method of claim 1, further comprising:
   computing broadband magnitude levels of the magnitude response functions of the acoustic sensors; and
   computing a reference broadband magnitude level being one in the group comprising:
   a) an average of the broadband magnitude levels,
   b) a median of broadband magnitude levels;
   and computing said target response function by normalizing a predefined target response shape by the reference broadband magnitude level.

7. The method of claim 1, wherein the acoustic sensors are arranged in a manner ensuring spatial diversity,
   the method further comprising performing a spatially directive measurement while applying the calibration function.

8. A computer readable medium storing computer-readable instructions for performing the method of claim 1.

9. A controller connectable to a plurality of acoustic sensors arranged in a non-anechoic environment and to at least one audio source in the non-anechoic environment, the controller comprising:
   a measuring section configured to excite each acoustic sensor by causing the at least one audio source to produce an acoustic stimulus comprising a noise burst of finite duration and, concurrently herewith, to capture respective outputs from the acoustic sensors by activating the acoustic sensors;
   a windowing section configured to extract a non-initial time segment from the output from each acoustic sensor during a time interval beginning a finite interval after the end of the acoustic stimulus;
   a magnitude response estimator configured to estimate a frequency-dependent magnitude response function of each acoustic sensor based on at least a non-initial portion of the output from each acoustic sensor supplied by the windowing section and on a spectral composition of the noise burst; and
   a calibrator configured to derive, for each audio sensor, a frequency-dependent calibration function based on a comparison of the magnitude response function of the sensor and a target response function which is common to all acoustic sensors.

* * * * *